(12) United States Patent
Frank et al.

(10) Patent No.: US 12,693,890 B2
(45) Date of Patent: Jul. 28, 2026

(54) SYSTEM AND METHOD FOR DIGITAL AUTOMATION GOVERNANCE

(71) Applicant: Verizon Patent and Licensing Inc., Basking Ridge, NJ (US)

(72) Inventors: Howard Frank, Lithia, FL (US); Gary Lueking, Lewisville, TX (US); Teri Marie Thompson, Brandon, FL (US); Arthi Bhat, Allen, TX (US); Madhuri Medarametla, Hyderabad (IN); Jennifer Ilanit Gibli, Fair Lawn, NJ (US); Douglas T. Connor, Keller, TX (US); Nathane D. Johnson, Colorado Springs, CO (US); Somesh Nagalla, Little Elm, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 724 days.

(21) Appl. No.: 17/405,704

(22) Filed: Aug. 18, 2021

(65) Prior Publication Data

US 2022/0382580 A1 Dec. 1, 2022

(30) Foreign Application Priority Data

May 31, 2021 (IN) ............................ 202141024139

(51) Int. Cl.
*G06F 9/48* (2006.01)
*G06F 9/451* (2018.01)

(52) U.S. Cl.
CPC .............. *G06F 9/485* (2013.01); *G06F 9/451* (2018.02)

(58) Field of Classification Search
CPC . G06F 9/485; G06F 9/451; G06F 8/38; G06F 8/70; G06Q 10/0631
See application file for complete search history.

(56) References Cited

U.S. PATENT DOCUMENTS

| | | | | |
|---|---|---|---|---|
| 8,639,553 | B1 * | 1/2014 | Knauth | G06Q 10/06312 705/7.22 |
| 2003/0144758 | A1 * | 7/2003 | Duggirala | G06F 30/00 700/104 |
| 2010/0162389 | A1 * | 6/2010 | Burger | G06F 21/6218 726/21 |
| 2016/0180469 | A1 * | 6/2016 | Keating | G06Q 40/08 705/4 |
| 2018/0300304 | A1 * | 10/2018 | Mullins | G06Q 10/10 |
| 2021/0011698 | A1 * | 1/2021 | Bond | G06F 11/3466 |
| 2021/0096878 | A1 * | 4/2021 | Chomakov | G06F 9/5027 |
| 2021/0347062 | A1 * | 11/2021 | Dinica | G06F 8/36 |
| 2021/0349450 | A1 * | 11/2021 | Cinca | G06F 11/3414 |
| 2022/0066749 | A1 * | 3/2022 | Sankaran | G06F 8/36 |

* cited by examiner

*Primary Examiner* — Jorge A Chu Joy-Davila

(57) ABSTRACT

A system and method are described that receive from a client device a request for information associated with a digital automation. An automation type associated with the digital automation is determined, and based on the automation type, a workflow is retrieved. The workflow manages a lifecycle of the digital automation. One or more workflow components associated with the workflow are retrieved, and a user interface based on the workflow and the workflow components is generated. The user interface includes information associated with the digital automation. The user interface is provided to the client device in response to the request.

20 Claims, 18 Drawing Sheets

300

400

400

235

240

245

245

255

SYSTEM AND METHOD FOR DIGITAL AUTOMATION GOVERNANCE

CROSS-REFERENCE TO RELATED APPLICATION

This application claims priority to Indian Provisional Application No. 202141024139, filed May 31, 2021, the disclosure of which is hereby incorporated by reference herein.

BACKGROUND

Large organizations have been increasingly relying upon digital automations to perform tasks which previously were accomplished by humans. Early digital automations merely involved a developer producing a list of actions to automate tasks using dedicated scripting languages, and/or interacting with back-end systems using application programming interfaces (APIs). Modern digital automations, which may include artificial intelligence (AI) entities referred to as "bots," are expected to operate largely autonomously over a wide variety of situations. Existing approaches for properly configuring and deploying a large number of digital automations throughout an enterprise can be error prone, time consuming, resource intensive, and difficult to manage.

DETAILED DESCRIPTION OF EXAMPLE EMBODIMENTS

Figure 1:
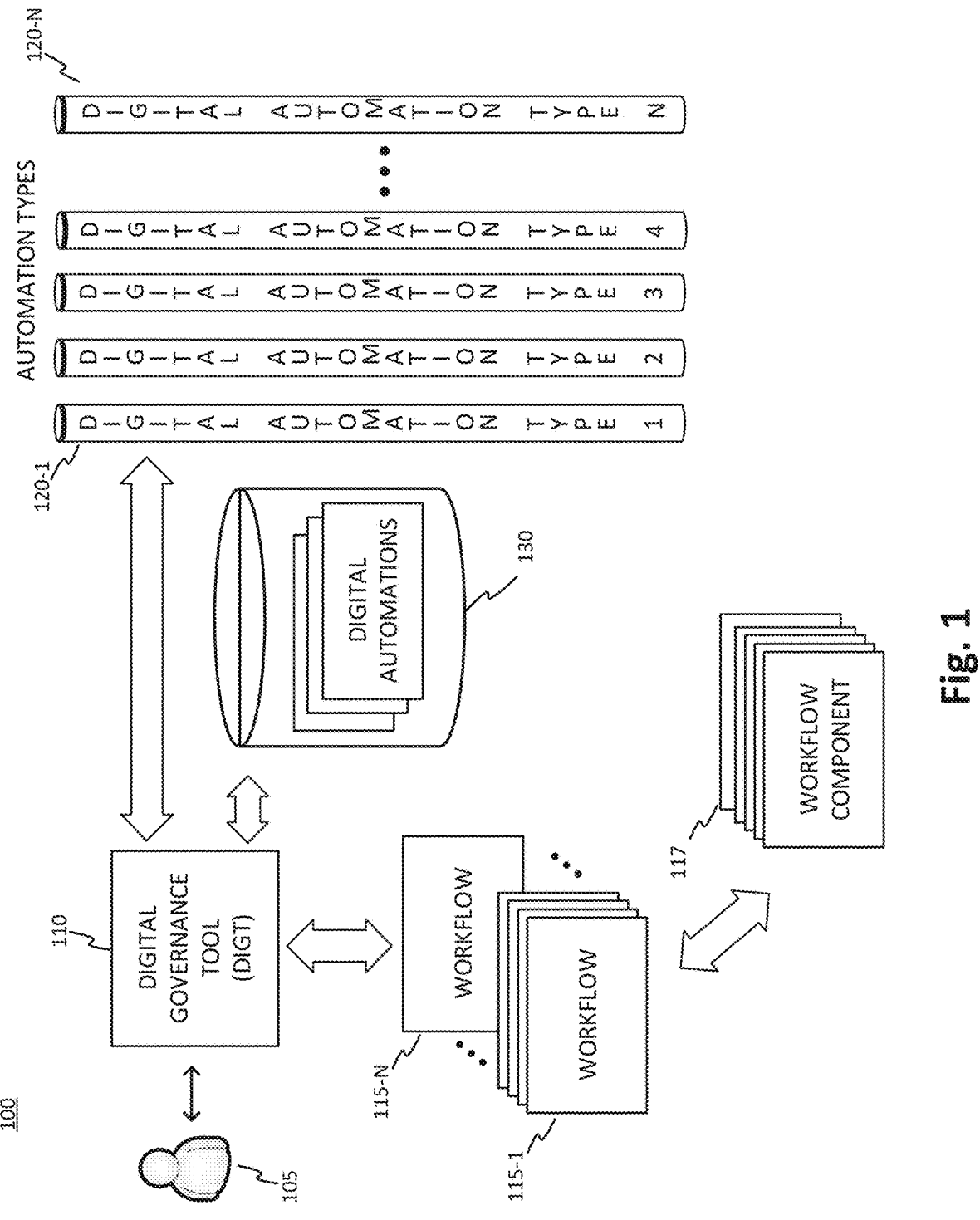
FIG. 1 is a diagram illustrating an overview of digital automation environment according to an embodiment.

The following detailed description refers to the accompanying drawings. The same reference numbers in different drawings may identify the same or similar elements.

Embodiments described herein are directed to systems and methods for digital automation governance. As used herein, the terms "governance" and/or "governing digital automations" encompasses managing digital automations, including such operations as development and deployment of digital automations, tracking operational status of digital automations, recording lifecycle events of the digital automations, and enforcing approved processes associated with the lifecycle of the digital automations. As used herein, a digital automation may be defined as any type of machine automation which can automate one or more processes to improve a user workflow. Digital automations may include any type of digital process automation (DPA), process mining, scripting, interpreted and/or compiled programming, and/or artificial intelligence modeling. In an embodiment, governance of digital automations may be performed by a Digital Governance Tool (DiGT). Through DiGT, developers and/or operations personnel may efficiently develop, configure, deploy, and/or maintain digital automations throughout an organization, and do so by a process that enables policy enforcement and efficient management. In doing so, a wide range of technical development and operation aspects may be taken into consideration for the development, deployment, and execution of the digital automations. Accordingly, DiGT provides a systematic way to identify where and when a particular digital automation is an appropriate tool to address a task, and ensure that the digital automation is developed, configured, and deployed properly.

DiGT may interact with any type of digital automation, such as, for example, robotic desktop automations (RDAs), robotic process automations (RPAs), etc. As used herein, RDAs, may refer to digital automations that record (or are otherwise configured to perform) user operations associated with a task in a user interface (UI), and repeat the operations directly in the UI. For example, an RDA may be used to perform report generation, data scraping, file transfers, spreadsheet automation, etc. RDAs may be operated in an attended manner under human supervision, such as on a user's workstation using the credentials of the user, where the results of the operations may be observed. As used herein, an RPA may refer to digital automations that are programmed to perform operations that may be associated with multiple tasks across multiple applications and possibly multiple user roles. Each of these roles may have different authorization permissions, using their own provisioned credentials, over the multiple applications. Roles may also control data visibility, such as, for example, an RPA role cannot see chatbot use cases. RPAs may span departments or job functions across an organization. For example, RPAs may perform tasks in call center operations, data migration, forms processing, claims administration, help desk services, etc. RPAs are typically not operated under human supervision (i.e., are unattended), however the output of the RPA (e.g., messages, log files, other work product) may be observed. In some embodiments, RPAs may operate within virtual machines. The lack of human supervision makes RPAs more susceptible to failures—and more susceptible to unrecognized failures—which increases the importance of the use of more rigorous management tools. Other types of digital automations that may have characteristics of either or both of RDAs and RPAs include "chatbots" and "natural language processors" which may provide automated language-based interfaces to users.

FIG. 1 is a diagram illustrating an overview of environment 100 according to an embodiment. Environment 100 may include a digital governance tool (DiGT) 110, automation types 120-1 to 120-N (referred to herein plurally, but not necessarily collectively or in their entirety, as "automation types 120", and individually as "automation type 120-x"), workflows 115-1 to 115-N (referred to herein plurally, but not necessarily collectively or in their entirety, as "workflows 115", and individually as "workflow 115-x"), workflow components 117, and one or more digital automations 130. The relationships between these concepts will be further described below.

Digital automations 130 encompass applications that perform a defined set of automated operations within a computing environment, as noted above. In some implementations, digital automations 130 can be implemented as foreground and/or background processes on one or more systems remote from the DiGT, which may, in some instances, run periodically, continuously or on demand. Accordingly, it may be desirable to have a systematic approach to ensure the digital automations 130 are developed, configured, and deployed in a manner that will ensure they operate properly—e.g., producing an expected result without unexpected side effects. Moreover, given the large numbers of potentially different types of digital automations 130 that may be available for use, it may be desirable for DiGT 110 to be capable of flexibly accommodating the different management needs that each type of digital automation 130 may require.

Further referring to FIG. 1, DiGT 110 may be implemented as a system that includes facilities to manage digital automations through various lifecycle activities or stages. In the example embodiment, DiGT 110 provide an interface to a user 105 that allows user 105 to interact with DiGT 110 to provide input and obtain information for management of digital automations 130. DiGT 110 also includes facilities to programmably specify management activities onto the digital automation lifecycle. For example, DiGT 110 may use one or more automation types 120 to classify digital automations for purposes of lifecycle workflow. As shown in FIG. 1, automation types 120-1 through 120-N may be a collection of digital automation types 1 through N which may be used to identify different workflows to apply to identifying/developing/managing digital automations 130. Digital automation types may allow for more efficient specification of digital automation management by allowing digital automations that share common characteristics and/or requirements to share common workflows. For example, in one implementation, the digital automation types 120 may include separate types for RPAs, RDAs, chat bots, natural language generators, natural language processors, advanced analytics tools, visualizations, and/or scripted automations. Other types/designations of automation types 120 are also possible depending on implementation. Each automation type 120-x may map to an associated workflow 115-x that may be specifically designed for use with digital automations 130 of the automation type 120-x. An additional benefit of each digital automation 130 being associated with an automation type 120 is that users 105 may be able to more easily search for/identify available automations to perform a desired task.

As shown in FIG. 1, DiGT 110 may store (or have access to a database that stores) a collection of workflows 115 (depicted as workflows 115-1 through 115-N). A workflow 115 is associated with an automation type 120, and may specify a lifecycle workflow that applies to digital automations 130 that are of the same automation type 120. The workflow 115 may include indications of certain of the workflow components 117 that may be relevant to the management of the lifecycle of digital automations of the associated automation type 120. This allows DiGT 110 to implement lifecycle workflows applicable to a digital automation 130 in a configurable manner, thereby allowing workflows to address concerns that are relevant to a specific digital automation 130 (and avoid concerns that are not relevant to a specific digital automation 130), while allowing for component reuse to reduce implementation times and resource usage.

Further referring to FIG. 1, a collection of workflow components 117 may be stored by DiGT 110 in a database accessible to DiGT 110. Workflow components 117 may be components that include one or more capabilities that may be applicable to development/management of a digital automation 130, as well as UI elements that allow for user input/display of information related to the component's capabilities (such as state, measurements, logging, alerting, and the like). Workflow components 117 may further include comments from a user directing another person to perform an action. Workflows 115 may include references to workflow components 117 such that when the workflow is used, the desired workflow component 117 is used as part of the workflow.

Figure 2:
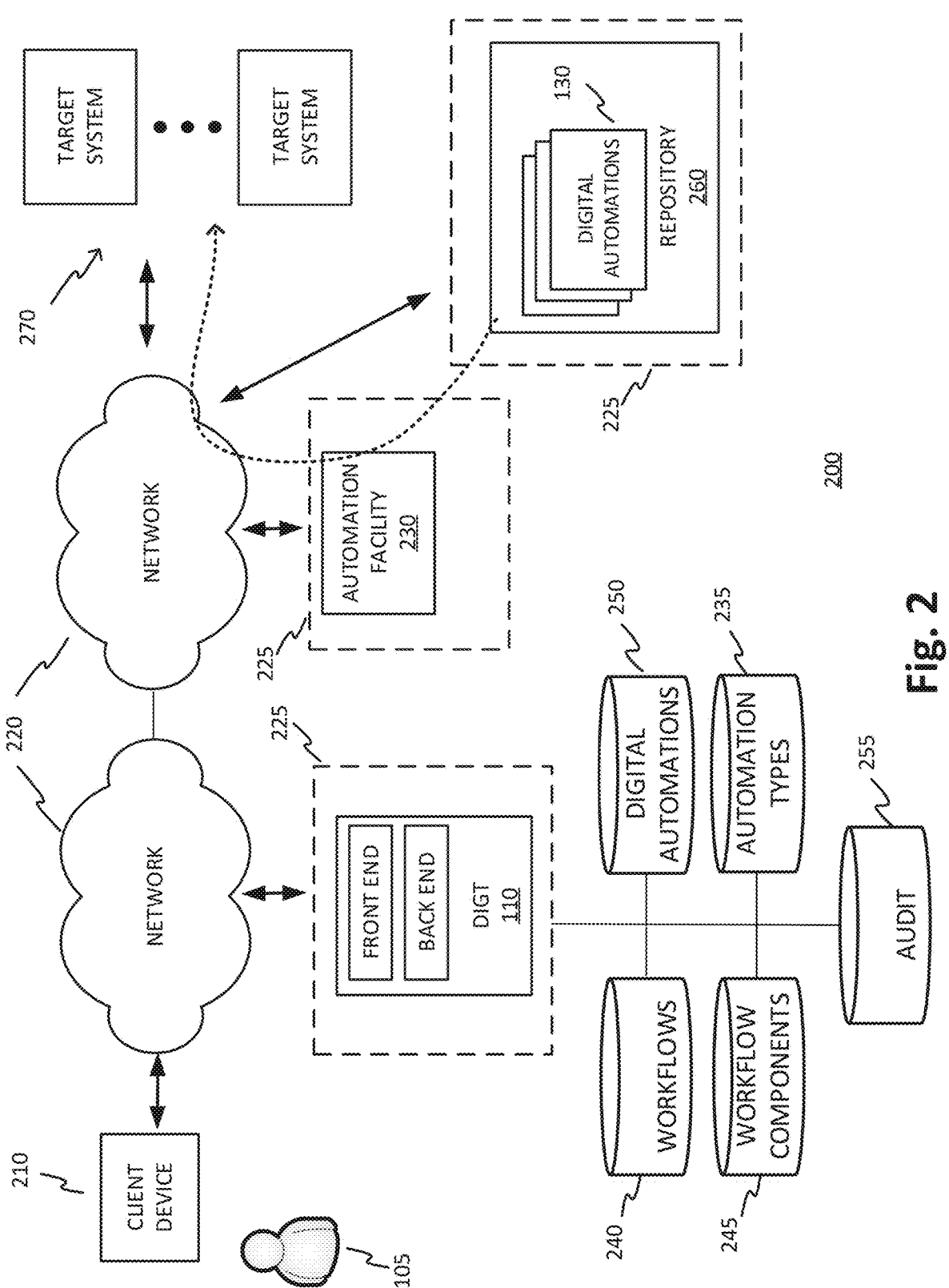
FIG. 2 is a block diagram showing an example networking environment for a digital automation governance tool (DiGT), according to an embodiment.

FIG. 2 is a block diagram 200 showing an example environment 200 associated with DiGT 110. Environment 200 may include client device 210, one or more networks 220, one or more server devices 225, DiGT 110, automation facility 230, data stores 235-255, repository 260 and target systems 270. Other embodiments may include additional or different network entities in alternative configurations than those illustrated in FIG. 2. Communications between the aforementioned network entities may take place through network(s) 220 directly and/or through other intermediary systems (not shown).

Figure 3:
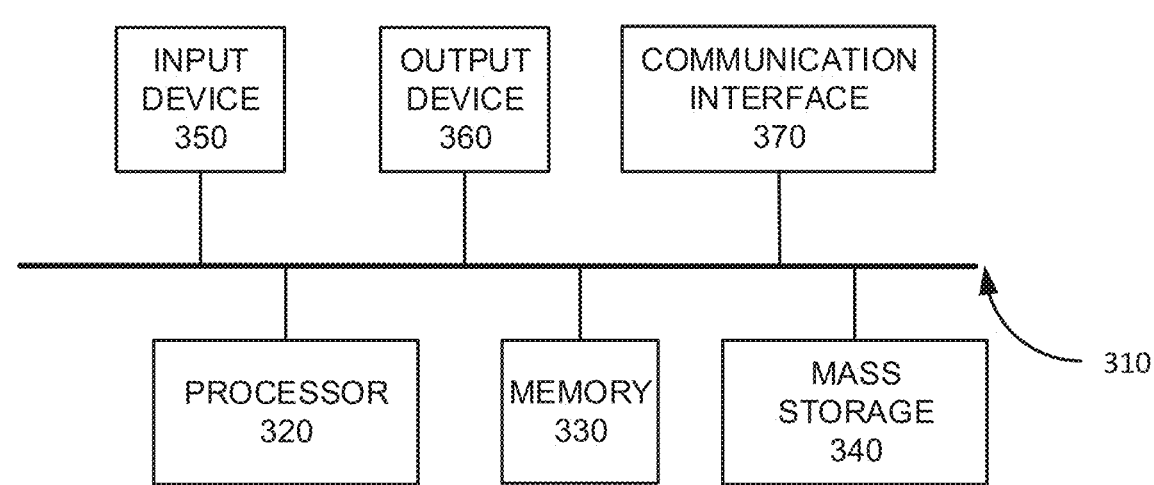
FIG. 3 is a block diagram showing example components of a client device associated with DiGT, according to an embodiment.

Client device 210 may be any computing device which may communicate over network 220 to access DiGT 110. For example, client device 210 may execute a client application (e.g., browser application, native application) that may communicate with the user interface elements of DiGT 110 using networking protocols (e.g., HTTP). Client device 210 may include one or more computing devices, such as a laptop computer, a desktop computer, a tablet computer, smartphone, etc., and may be implemented, for example, as illustrated in FIG. 3. A user 105 of client device 210 may be an individual within an organization, such as a developer or an operations engineer. In an embodiment, client device 210 may provide user input facilities to allow user 105 to provide input to DiGT 110 based on standard mouse commands for controlling the cursor and selection objects and text (e.g., clicks, double-clicks, drags, selections, etc.), and keyboard commands or voice commands issued by user 105. Exemplary interfaces of DiGT 110 that may be displayed by client device 210 are described below in reference to FIG. 6.

DiGT 110 may be implemented on one or more server devices 225, and may take the form of an application having a "front end" user interface and a "back end" operational program and one or more data stores. In an embodiment, the front end of DiGT 110 (e.g., user interface) may be implemented using a framework for building front end applications and user interfaces, such as, for example Angular, React, Vue, etc. The back end of DiGT 110, which provides operation capabilities and data manipulation/storage as described herein, may be implemented using an appropriate software language, such as, for example Java.

DiGT 110 may include (or be in communication with) one or more data stores. For example, FIG. 2 shows data stores 235-255 used by DiGT 110 for storage of various components and information. In some embodiments, the data stores may be implemented in one or more relational databases such as a PostgreSQL database application. In the illustrated example, an automation type data store 235 may store information related to each automation type 120, such as a name and/or other identifier. A workflow data store 240 may store information related to each workflow 115, such as a name and/or other identifier, an association to an automation type 120, associations to workflow components 117, an order in which workflow components 117 should be presented as part of workflow 115 and mappings to UI presentation components. A workflow components data store 245 may store items related to implementing each workflow component 117, such as user input elements, element ordering, and the like. A digital automation data store 250 may store information associated with a digital automation 130 that is being managed by the DiGT 110, such as name and/or identifier(s), persons and/or roles associated with the digital automation 130, an automation type 120, information submitted and/or generated according to the processing of a workflow 115, and state/status information associated with the lifecycle of the digital automation 130. An audit data store 255 may store a record of changes made to stored system data (e.g., changes to automation types data store 235, workflow data store 240, workflow components data store 245 and/or digital automations data store 250), include the user associated with the change, the date/time of the change and the information changed.

Network(s) 220 may include a local area network (LAN) and/or a wide area network, which may be realized using wired and/or wireless networks. The wireless network may further include one or more wireless networks of any type, such as, for example, a local area network (LAN), a wide area network (WAN), a wireless satellite network, and/or one or more wireless public land mobile networks (PLMNs). The wireless networks may include Wi-Fi (e.g., any IEEE 802.11x network, where x=a, b, c, g, and/or n), or wireless network covering larger areas, which may include mesh networking (e.g., IEEE 802.11s) and/or or a WiMAX IEEE 802.16. The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Network 220 may further include one or more wired networks, which may include a local area wired network, wide area networks, and/or backhaul networks, backbone networks, metro-area networks, and/or the Internet. Specifically, the wired network(s) may include a wide area network that connects backhaul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Automation facility 230 may be implemented in one or more servers 225 and capable of communicating via network 220 with DiGT 110 and/or connect to other resources to deploy and execute digital automations 130, as desired. Automation facility 230 may include one or more applications that execute digital automations 130. In some embodiments, automation facility 230 may communicate with a repository 260 that stores digital automations 130, and may receive digital automations 130 from repository 260 prior to executing a digital automation 130 use automation facility 230. In some implementations, automation facility 230 may deploy digital automations to target systems 270 via network 220 for execution on such target systems 270. In some implementations, automation facility 230 may execute digital automations 130 within automation facility 230, with such digital automations accessing target systems 270 using networks 220 to perform the tasks associated with digital automations 130. The connection of digital automations 130 from repository 260 to target systems 270 via automation facility 230 is exemplified by the dashed arrow shown in FIG. 2. In some embodiments, DiGT may connect to a subset of target systems 270 having particular configurations, such as, for example, those running Jira and LDAP (lightweight directory access protocol). However, DiGT but may not connect to other target systems 270, depending upon the configuration of such target systems 270.

Repository 260 may be a facility implemented in one or more servers 225 that stores digital automations 130. For example, repository may include a code repository, a continuous delivery build system, and the like. Repository 260 may be accessible via networks 220, such that digital automations 130 can be deployed to automation facility 230 and/or target systems 270.

Target systems 270 may be systems implemented as applications, servers, services, and the like, that may be acted on by digital automations 130. Target systems 270 may be accessible via networks 220 such that digital automations 130 may be deployed to target systems 270 and/or digital automation 130 may access the target systems 270 from automation facility 230.

Figure 6:
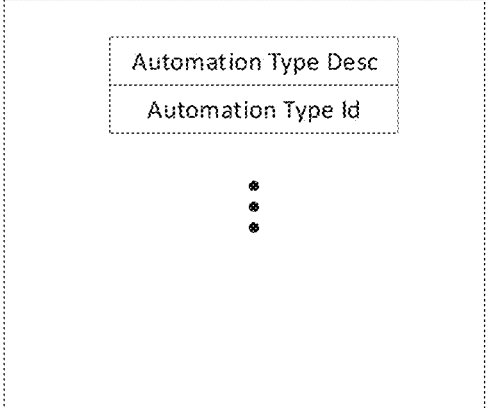
FIG. 6 is a first data store example associated with DiGT, according to an embodiment.

In the example embodiment, DiGT 110 uses data stores 235-255 to implement a flexible lifecycle management system for digital automations 130. An example portion of automation types data store 235 is illustrated in FIG. 6. Each automation type 120 may be specified with an automation type id and automation type description, as well as other information items that may be useful in managing automation types 120 (e.g., creation dates, last modified dates, audit information, etc.). The automation type Id may be used as an index to other information related to the automation type 120.

Figure 7:
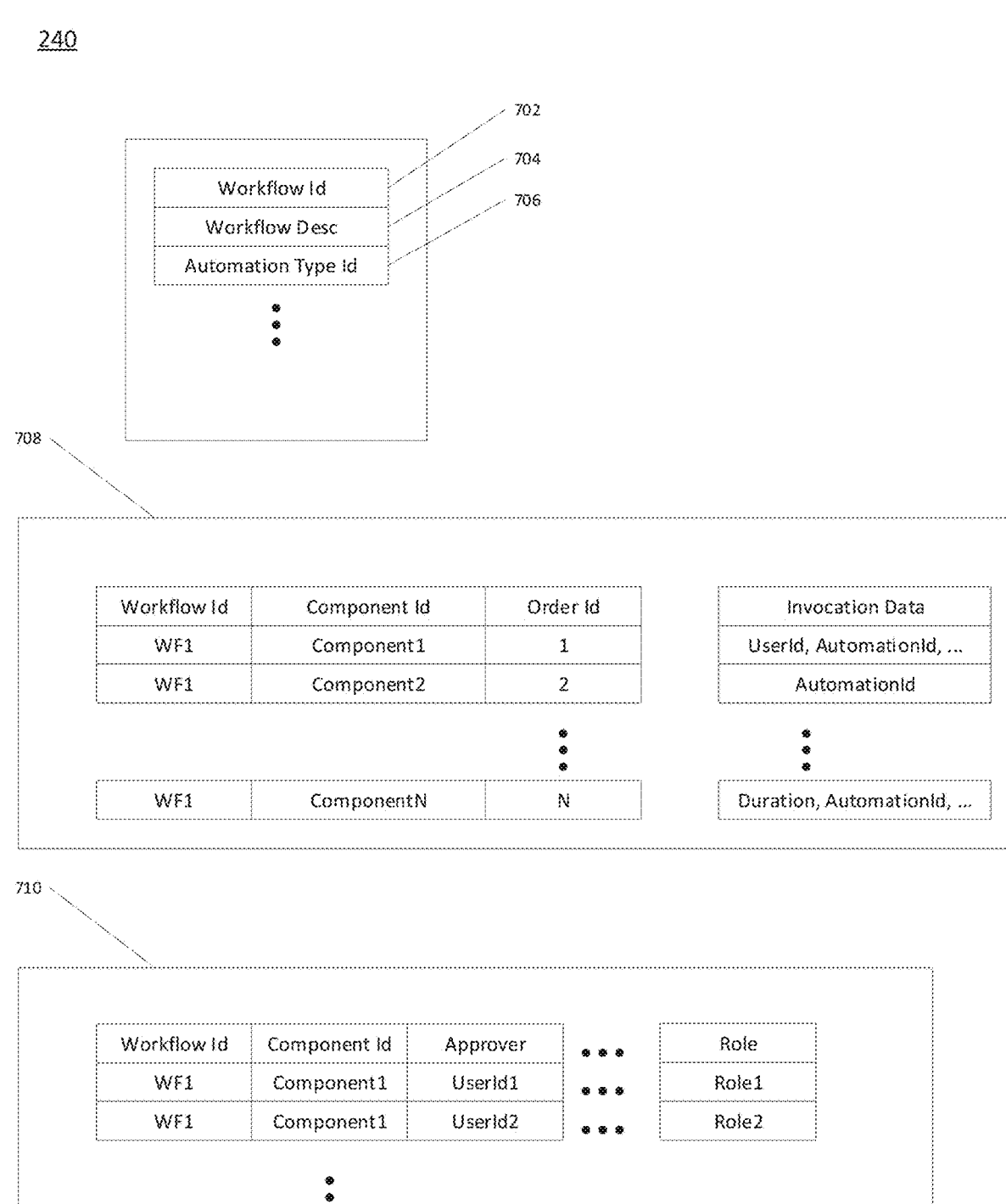
FIG. 7 is a second data store example associated with DiGT, according to an embodiment.

An example portion of workflow data store 240 is illustrated in FIG. 7. Each workflow 115 may be specified with a workflow Id 702 and workflow description 704, as well as with an identifier 706 associated with an automation type 120 (e.g., automation type id). Workflow data store 240 may include other information items that may be useful in managing automation types 120 (e.g., creation dates, last modified dates, audit information, etc.). The workflow Id may be used as an index to other information related to the workflow 115. For example, workflow data store 115 may include workflow components information that specifies the workflow components 117 that are used with the workflow 115. An example portion of such information is shown in FIG. 7, where the workflow components 117 associated with workflow 115 are specified in structure 708. As shown, multiple workflow components "Component1" through "ComponentN" are identified as associated with a workflow having the workflow id WF1. In the example, each workflow component may have its order in the workflow specified and may include information that may be used when the component is invoked. Another possible example portion of such information is shown in structure 710, where the workflow components 117 associated with workflow 115 are identified as associated with one or more persons who must approve the completion of a workflow component. In the example, each workflow component may be associated with one or more identifiers for users (e.g., UserId1, UserId2) and/or one or more identifiers for roles (e.g., Role1, Role2). Additional information may be included with the workflow information, depending on the implementation.

Figure 8:
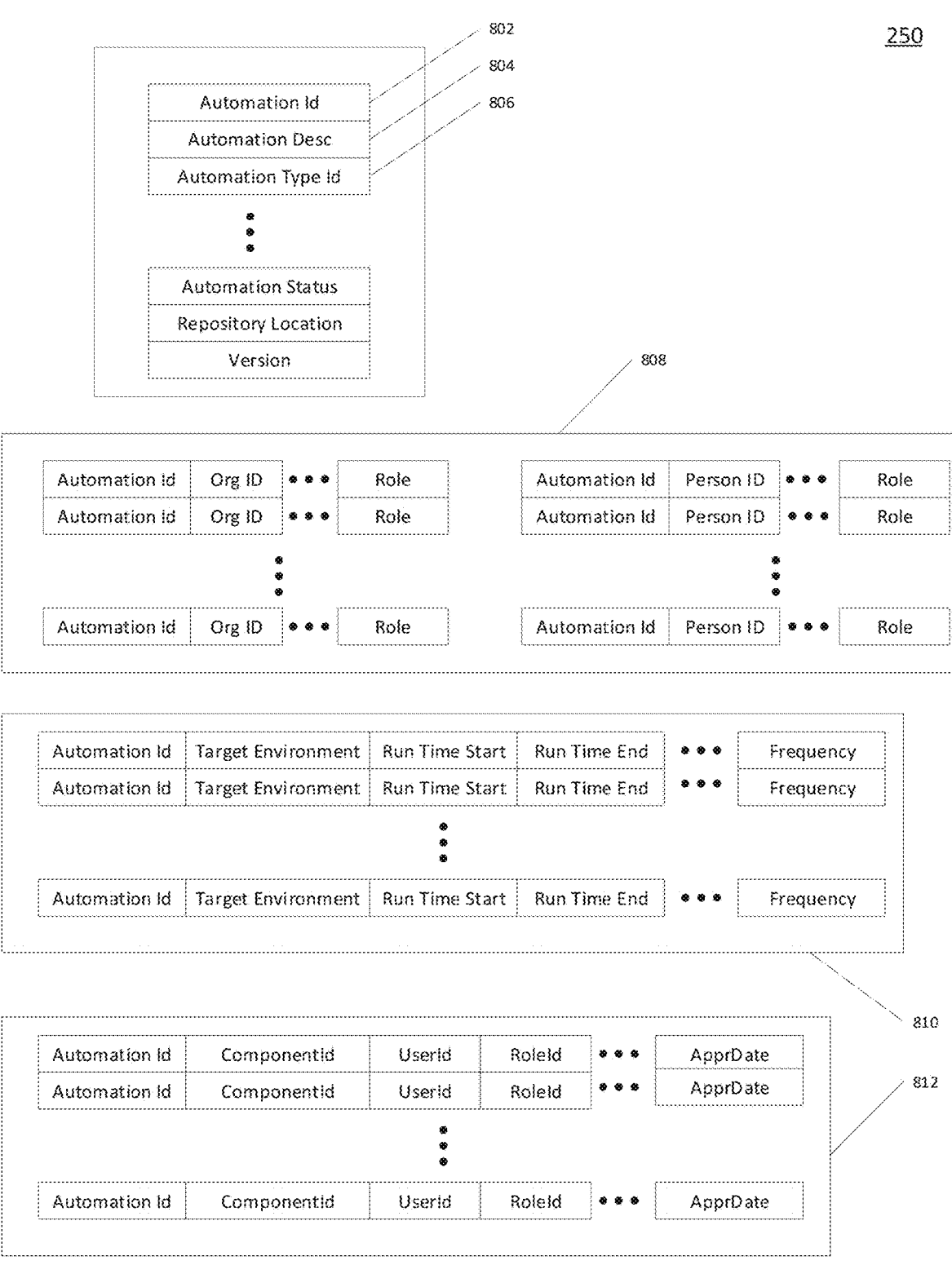
FIG. 8 is a third data store example associated with DiGT, according to an embodiment.

An example portion of automation data store 250 is illustrated in FIG. 8. Each digital automation 130 managed by DiGT 110 may have its information stored in automation data store 250. In the example of FIG. 8, an automation Id 802 and automation description 804 are stored, as well as an association 806 with an automation type 120 (e.g., using automation type id). Automation data store 250 may include other information items that may be useful in managing the lifecycle of digital automations 130, such as state information, deployment information (e.g., repository locations), history information, access control/audit information, and the like. For example, FIG. 8 shows some example personnel information 808 that may be used to specify groups or people that have been assigned roles with respect to the digital automation 130, and may have relevance for access control, logging/auditing of activities and notifications (which may have relevance to how workflow components 117 operate as part of a workflow 115, as described below). Also shown in FIG. 8 is some example execution information 810 that may identify target systems 270 on which the automation is being/has been executed and information about the operation and/or status of execution (e.g., run start/end/elapsed times, run frequency, result status, etc.).

In some embodiments, approval information that records approvals by persons/roles associated with a digital automation 130 may also be stored in digital automation data store 250. Shown in FIG. 8 is some example approval information 812 that may be used to track approvals by people/roles associated with the digital automation. In the example, an identifier for a person (e.g. UserId) and/or a role (e.g. RoleId) may be stored in association with identifiers for the digital automation (e.g. AutomationId) and/or workflow component (e.g. ComponentId), as well as a timestamp (e.g. time, date, datetime) for the approval. In some embodiments (such as described above with reference to FIG. 7), approval information may be generated using approval persons/roles specified in the workflow associated with the digital automation's automation type 120 (e.g., one or more persons/roles that are required to approve a workflow component in order for it to be considered completed). In some embodiments, approval information 812 may be generated using approval persons/roles specified in the workflow components 117 that are specified as part of the workflow 115 (such as described below). In some implementations the approval information may be generated using roles specified by the workflow/workflow component (noted above), which may then be used to determine persons that have been assigned to those roles in connection with the digital automation 130 (such as by using the personnel information 808 described above).

Figure 9:
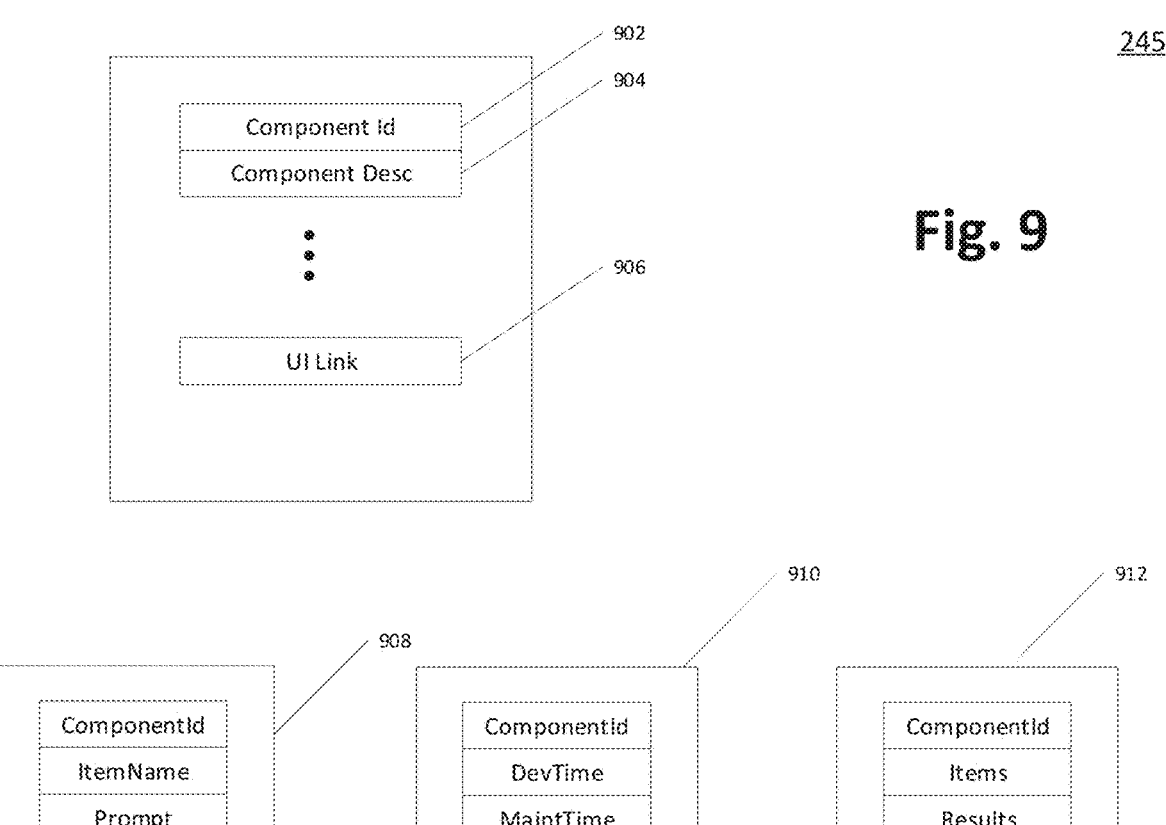
FIG. 9 is a fourth data store example associated with DiGT, according to an embodiment.
Figure 9:
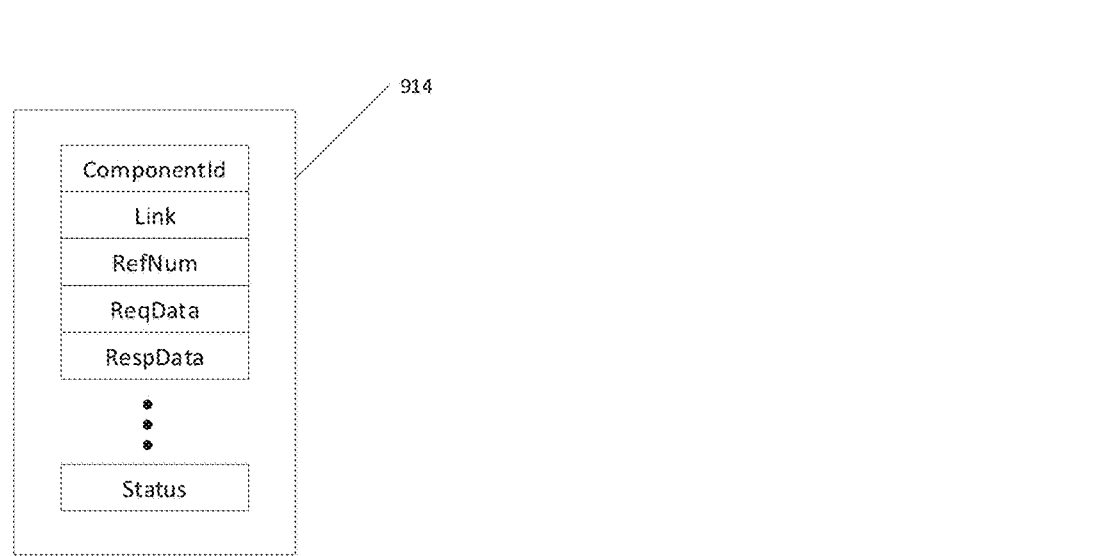

Workflow component data store 245 may take various forms, depending on the capabilities of the workflow component. In some embodiments, there may be some commonality in how each workflow component is associated with workflows, which may allow for easy identification and invocation. For example, an example portion of a workflow components data store 245 is illustrated in FIG. 9, where each workflow component 117 may have information stored such as a component ID 902 and component description 904, which may be common across workflow components, as well as other information that may be useful in allowing workflow components 117 to be invoked by a workflow 115. For example, a link 906 to associated user interface implementations may be provided such that when a workflow invokes the component, the user interface elements that correspond to the component may be rendered in the user interface.

In some implementations, each workflow component 117 may specify customized information in workflow components data store 245 that is specifically relevant to its capabilities and operation. Some examples of different possible workflow component are described below.

As one example, a workflow component 117 may implement a "checklist" capability of multiple user input elements. Workflow components data store 245 may include storage 908 that is associated with the "checklist" workflow component 117 and specifies the individual user input elements by name and/or identifier, data type, user prompt, default values, validation conditions, and the like.

Another example of a workflow component 117 may be a suitability component with capabilities to ascertain whether creating/deploying a particular digital automation 130 is appropriate to the situation and/or task. Workflow components data store 245 may include storage 910 that is associated with the "suitability" component 117 and specifies individual user input elements by name and/or identifier, and information used to perform the suitability analysis, such as expected development time, expected maintenance time, complexity ratings, expected usage amounts, equivalent work units replaced, and the like. In some implementations, the suitability analysis may include using the suitability information to perform an analysis that determines the net benefit of developing/deploying a particular digital automation 130 to perform a task.

Another example of a workflow component 117 may be a survey component to collect information from user 105 and/or from other sources for a digital automation 130, according to a set of inputs. Workflow components data store 245 may include storage 912 that is associated with the survey component 117 and specifies individual survey items (e.g., using JSON objects to specify prompts), survey responses (e.g., JSON objects specifying prompts and responses), people responsible for reviewing survey results, approvals by reviewers, status of the survey, and the like.

As another example, a workflow component 117 may include capabilities that access tools for use in managing a digital automation (e.g., a deployment tool, a development tool, etc.), and workflow components data store 245 may store in a record associated with the workflow component 117 information that allows access to the tools. Workflow components data store 245 may include storage 914 that is associated with the tool access component 117 and specifies links to the individual tools (e.g., URLs for APIs), reference numbers for requests, request data items (e.g., JSON objects), response data items (e.g., JSON objects), and request status information. For example, a deployment component (e.g., that includes capabilities to deploy digital automations 130 to target systems 270) may use an API link to provide a request to have a digital automation be deployed to its intended execution environment (e.g., by specifying in the request data its identifier(s), targets, credentials, etc.). The API may return a response indicating a result (e.g., success/fail, reference numbers for the execution session). In some implementations, the deploy component may include capabilities for monitoring the execution of the digital automation 130, for example through instrumentation present in the digital automation 130 or the execution environment. The deploy component may include UI elements to provide monitoring information to a user 105, such as execution status, performance statistics, sample outputs, log information, alerts, and the like. The deploy component may also include capabilities to stop execution of the digital automation 130, such as through a user command provided through the user interface or as may be prescheduled (e.g., the execution may be for a certain time period or number of executions).

Figure 10:
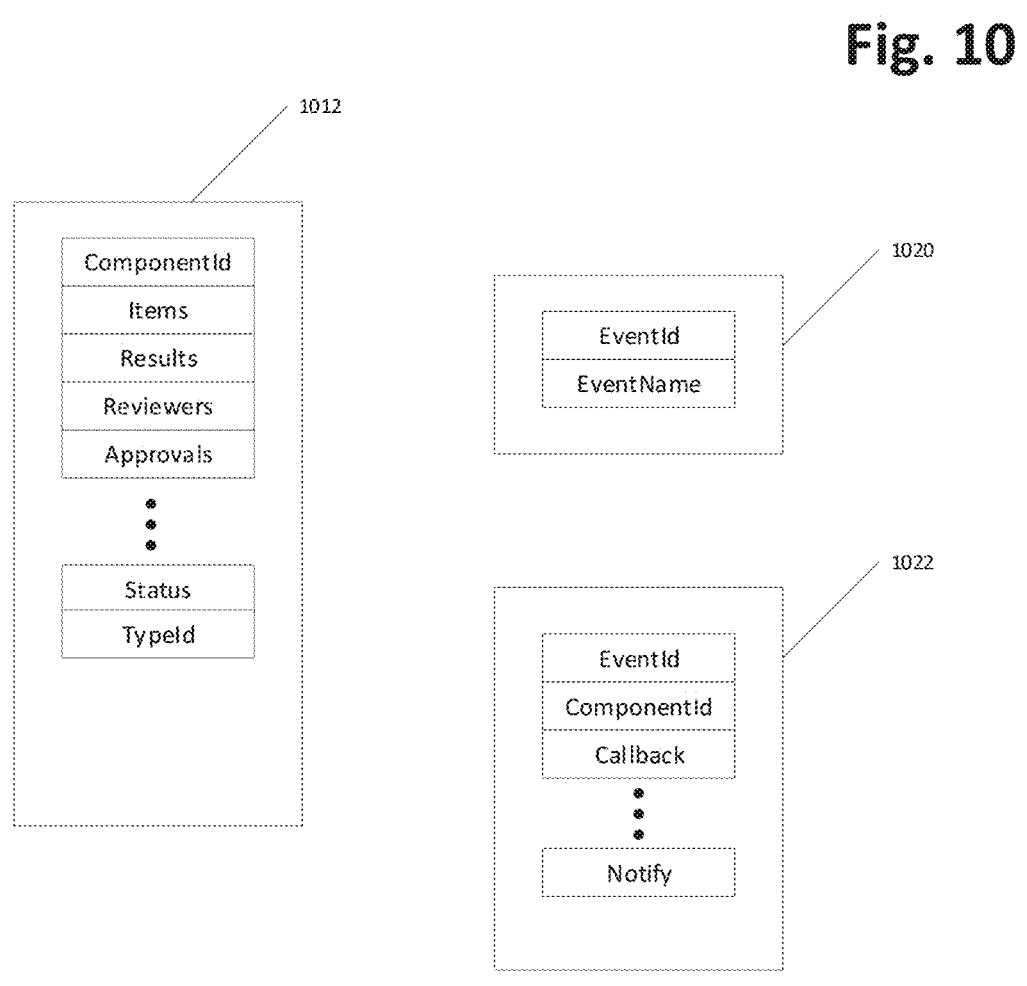
FIG. 10 is a fifth data store example associated with DiGT, according to an embodiment.

In some implementations, workflow components 117 may be customizable based on the automation type associated with the workflow in which the workflow component is included. For example, workflow component data store 245 may include information that associates automation types 120 with a workflow component 117, such that when the workflow component is included in a workflow associated with the automation type, the automation type may be used to include/exclude certain user input items. As one example, certain user elements associated with legal, security and/or other compliance processes may be included when the workflow component is used in a workflow for a digital automation that is an RPA automation type, but may be excluded from a workflow for a digital automation that is an RDA automation type (for example, because the desktop nature of RDA digital automations reduces certain risks). An example is illustrated in FIG. 10, where the survey workflow component 117 described previously above may have example information 1012 in workflow component data store 245 that includes an automation type id (e.g., "TypeId" as shown in FIG. 10).

In some implementations, a workflow component 117 may include capabilities to integrate people and/or roles into the component's operation (e.g., to be notified of activity, to be provided access to information related to activity, to be a required approver of activity) or trigger activities based on events associated with the component. Workflow components data store 245 may store in a record associated with the workflow component 117 information on people or roles that should be associated with the workflow component 117. In the example of FIG. 10, the survey workflow component 117 has specified one or more reviewers (e.g., "Reviewers") for responses to the survey in information store 1012 (e.g., in "Results" as shown in FIG. 10). Workflow component data store 245 further includes example event information 1020 (e.g., "EventId," "EventName") and example event handling information 1022, such that, when an event is detected associated with a workflow component (e.g., completion of a survey), one or more actions can be triggered (e.g., specified by an event handler callback (e.g., "Callback"), notification identifier (e.g., "Notify"), or other information). For example, one or more people with roles that are indicated as needing to be notified of the event may be sent a notification to their contact address.

Figure 11:
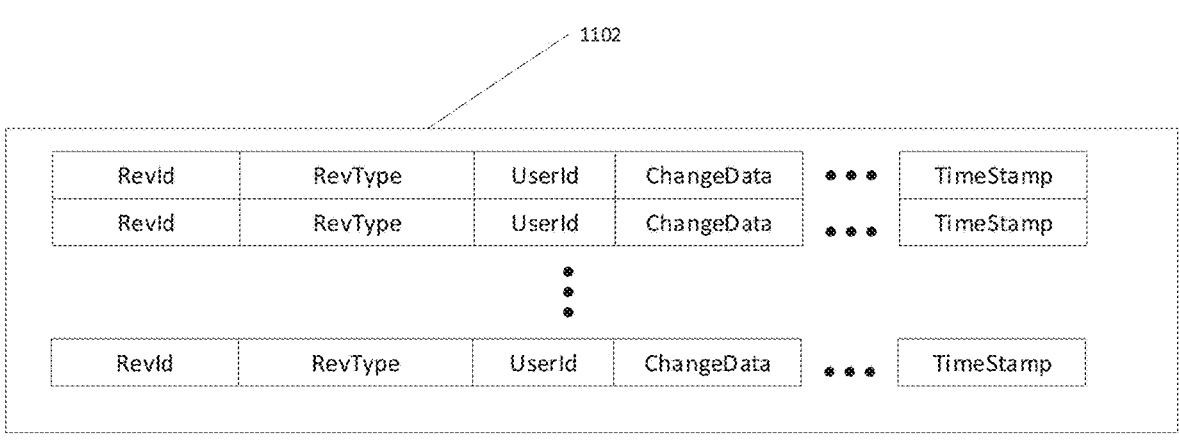
FIG. 11 is a sixth data store example associated with DiGT, according to an embodiment.

Audit data store 255 may include change information that reflects changes to the contents of data stores 235-250 and the context of the changes (e.g., user who made the change, time of the change, data that has been changed, etc.). DiGT 110 may be configured to cause change information to be stored in audit data store 255 each time a change is made to a data store 235-250, in order to track the context of changes, and provide a capability to report changes to users (e.g., audit reports) and provide for "rollback" to prior versions (e.g., an "undo" facility). An example portion of audit data store 255 is illustrated in FIG. 11. Example audit information 1102 may include a revision identifier and/or revision type (e.g., "RevId", "RevType"), an identifier of a user that made the change (e.g., "UserId"), a record of the changed data items and their previous/current values (e.g., "Change-Data") and a timestamp of the change time (e.g., "Time-Stamp"). Other information may also be stored depending on the implementation. In some implementations, change information may be generated for selected portions of data stores 235-250, and may be mapped to each portion such that there is an association between the change information and the data store for which change information is being collected. FIG. 3 is a block diagram of exemplary components of a computing system that may be included in one or more devices in environment 100 and/or networking environment 200, such as client device 210, automation device 230, service devices 240, repository 260 and target systems 270.

System 300 may include a bus 310, a processor 320, a memory 330, mass storage 340, an input system 350, an output system 360, and a communication interface 370. Bus 310 includes a path that permits communication among the components of system 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, the processor 320 may be an x86 based CPU, and may use any operating system, which may include varieties of the Windows, UNIX, and/or Linux. The processor 320 may also use high-level analysis software packages and/or custom software written in any programming and/or scripting languages for interacting with other network entities.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of RAID arrays. Mass storage 340 would be suitable for storing files associated with drafting, approving, designing, developing, deploying and maintaining digital automations 130.

Input system 350 provides an interface to allow for information input into system 300. Input system 350 may include, for example, a keyboard, a mouse, a pen, a microphone, a remote control, an audio capture device, an image and/or video capture device, a touch-screen display, and/or another type of input device. In some embodiments, system

300 may be managed remotely and may not include certain input devices but instead provides access to input system 350 via communications interface 370. Output system 360 provides an interface to allow for information output from system 300. Output system 360 may include a display (such as a liquid crystal display (LCD)), a printer, a speaker, and/or another type of output device. In some embodiments, system 300 may be managed remotely and may not include certain output devices, but instead provides access to output system 360 via communications interface 370.

Communication interface 370 may include a transceiver that enables system 300 to communicate over network 220 with other devices and/or systems. The communication interface 370 may include capabilities for wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a Wi-Fi) card for wireless communications.

Devices including a system 300 may perform operations (such as the capabilities described herein related to the DiGT and connected systems) through processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of a system 300 that may be included in systems described herein such as client device 210, automation device 230, server devices 240, repository 260 and target systems 270, in other implementations, any individual system may include fewer components, different components, additional components, or differently arranged components than depicted in FIG. 3.

Figure 4:
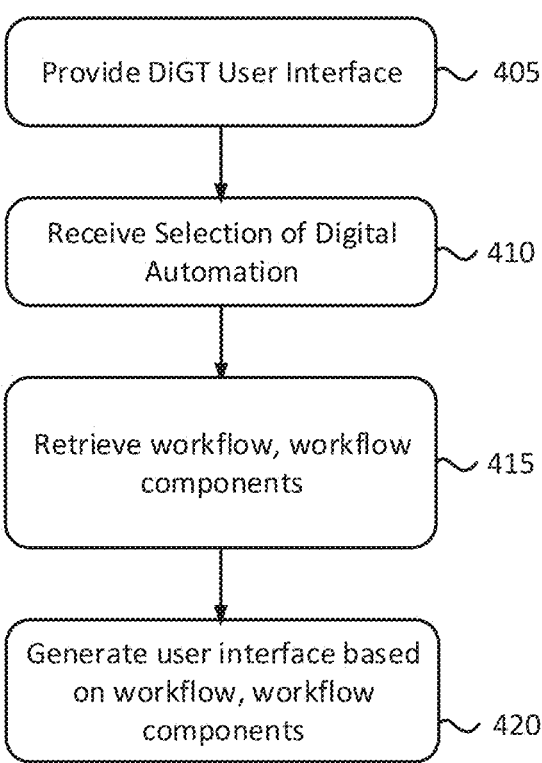
FIG. 4 is flow diagram illustrating an exemplary process associated with DiGT, according to an embodiment.

FIG. 4 is flow diagram illustrating an example process 400 associated with the operation of DiGT 110 to manage a digital automation 130. The process may begin by DiGT 110 (e.g., through execution of instructions by a processor 320) providing a user interface to a client device 210 that allows a user 105 to interact with DiGT 110 (block 405). The user interface may include a facility that allows the user 105 to login using credentials to verify identity and allow DiGT 110 to determine any roles that may be assigned to user 105 (e.g., admin, developer, reviewer, operations, and the like). The user interface may be generated by DiGT 110 based on the user 105. For example, certain portions of the user interface may not be exposed depending on the role(s) assigned to user 105, or a state of the user interface may be set according to a user profile associated with user 105 (e.g., a user's prior location or settings in the user interface may be stored and used to recreate the same user interface when the user returns).

Figure 12:
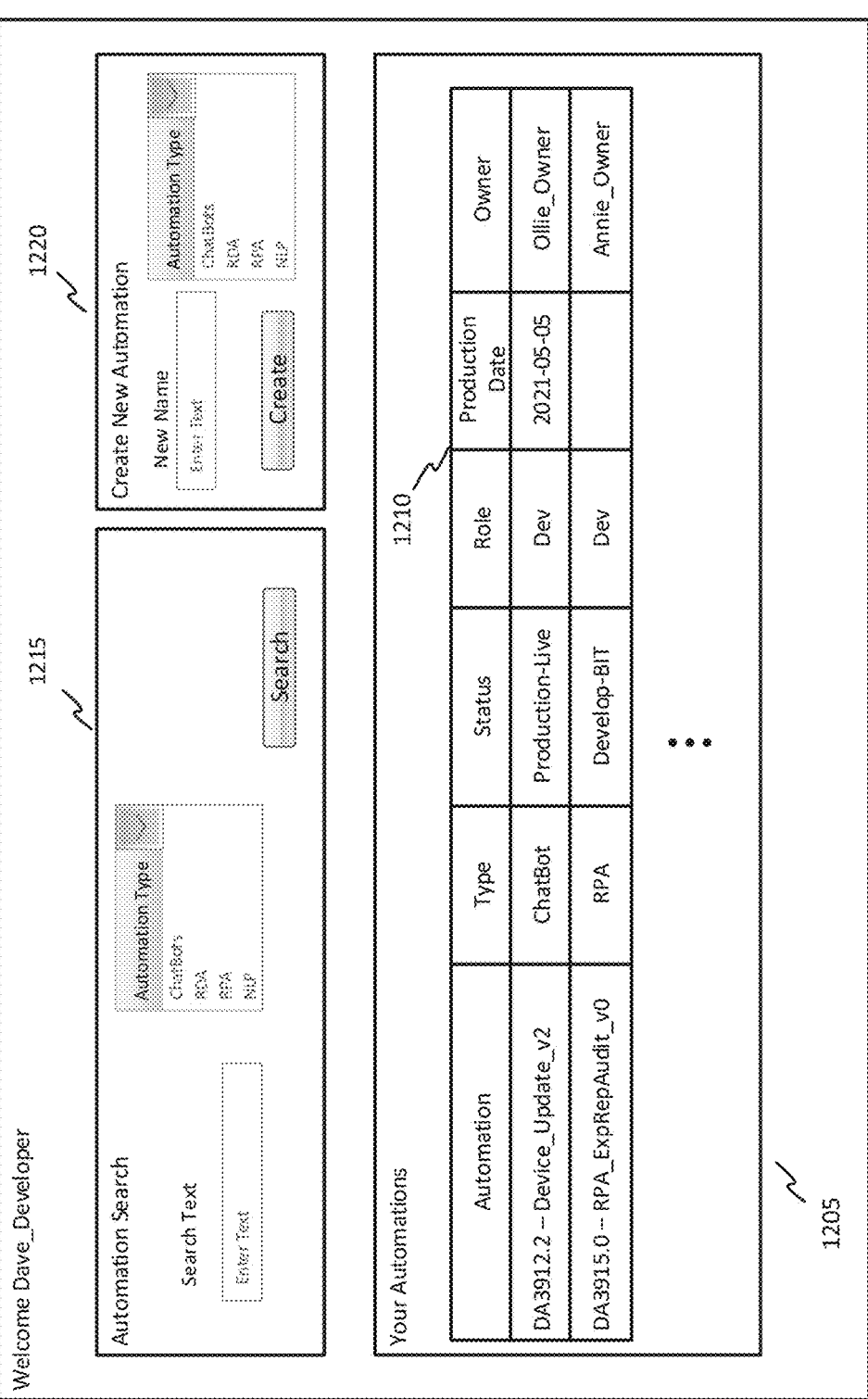
FIG. 12 is a diagram illustrating a first example user interface associated with DiGT, according to an embodiment.

In some embodiments, DiGT 110 may show a user interface that allows a user to find and select a digital automation 130 to for which to provide information. FIG. 12 illustrates an example user interface 1200 that may be provided. The user interface 1200 displays an area 1205 with a number of digital automations 130 that may be associated with user 105. For example, a table 1210 with information associated with each digital automation may be displayed, such as a name and/or identifier, an automation type, a status, a location, a user role, timing information (e.g., start time, elapsed time). In some implementations, each entry in the table may be a selectable element such that by user 105 selecting an entry, a user interface is requested that will display a workflow 115 associated with the automation type 120 of the selected digital automation 130.

In some embodiments, the user interface 1200 may provide an area 1215 to allow the user to search for a digital automation 130. For example, a user may specify an automation name, and automation type 120, or other information, and DiGT 110 will provide search results related to the search (for example, in area 1205).

In some embodiments, the user interface 1200 may include an area 1220 to allow a user to begin development or onboarding of a new digital automation 130. The interface may provide an element to allow the user to specify an automation type 120 for the digital automation 130 (e.g., selected from the automation types 120-1 . . . 120-N). DiGT 110 may receive a selection, by user 105, of the automation type 120 and may then request a user interface that will display a workflow 115 associated with the automation type 120 selected. In some implementations, the interface may provide other prompts for a type of task and/or use case type, which may allow DiGT 110 to determine the automation type 120 that is applicable, and may be more useful to allow users to properly select an automation type that would be applicable to the automation tasks that are to be performed.

Assume a user selects a digital automation from user interface 1200. DiGT 110 receives the selection (block 410) and based on the selection, retrieves the workflow and workflow components associated with the selected digital automation 130 (block 415). For example, DiGT 110 (e.g., through execution of instructions by a processor 320) may retrieve, based on a selected digital automation 130, the automation type 120 associated with the selected digital automation 130 (e.g., by querying digital automation data store 250). DiGT 110 may further use the associated automation type 120 to retrieve a workflow 115 that is associated with the automation type 120 (e.g., from workflow data store 240). DiGT 110 may use retrieved workflow 115 to retrieve workflow components 117 specified by retrieved workflow 115 (e.g., from workflow components data store 245).

DiGT 110 may then use the retrieved workflow 115 and retrieved workflow components 117 to generate a user interface based on the workflow (block 420). For example, each workflow component 117 may specify user interface elements that may be used to render the workflow component 117 inside the user interface, and DiGT 110 may (e.g., through execution of instructions by a processor 320) generate the user interface using the user interface elements as well as state information associated with the workflow component 117 as applied to selected digital automation 130.

Figure 13:
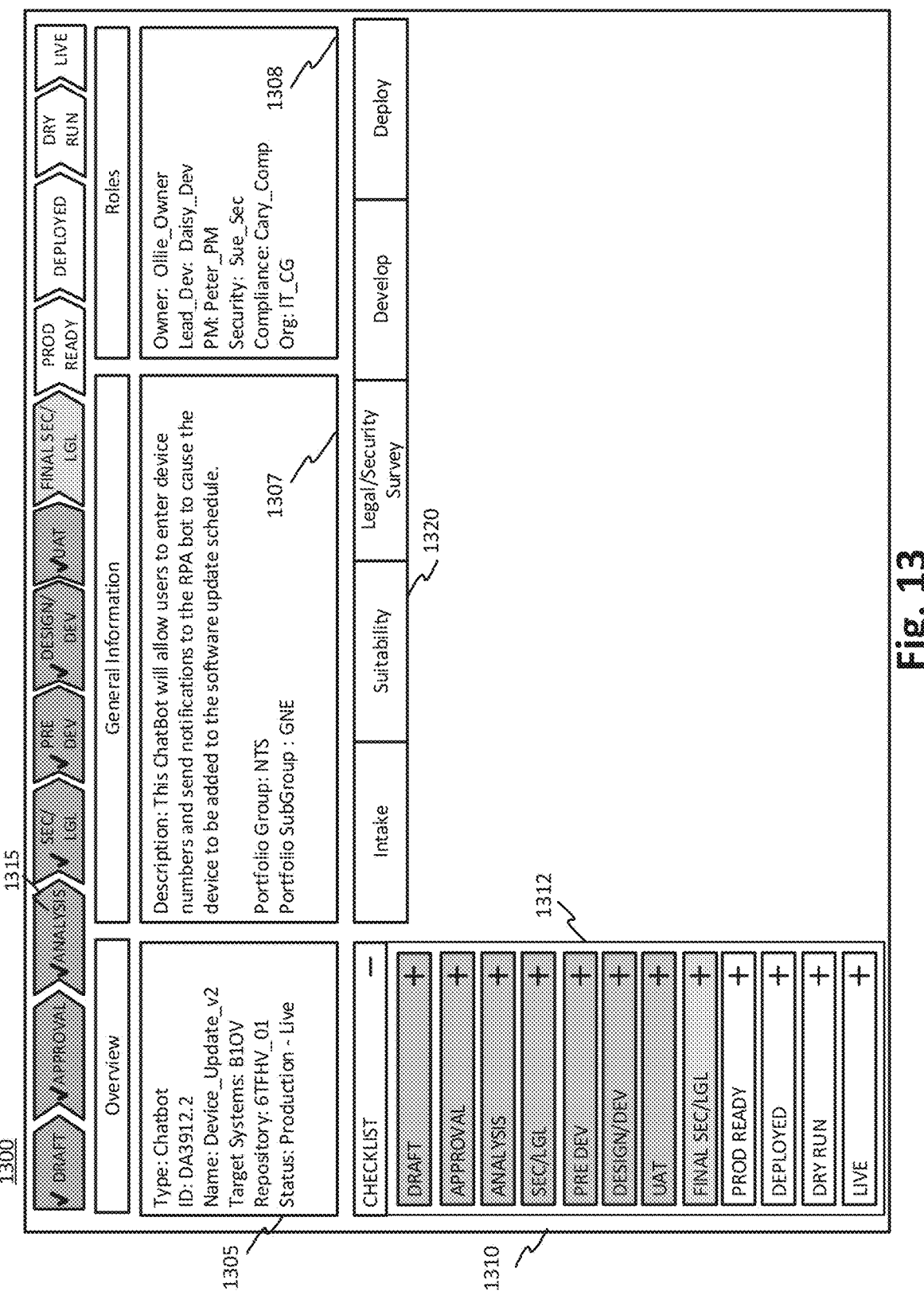
FIG. 13 is a diagram illustrating a second example user interface associated with DiGT, according to an embodiment.

An example of a digital automation user interface is illustrated by FIG. 13, which depicts a digital automation user interface 1300. User interface 1300 shown in FIG. 13 illustrates an example digital automation user interface that may be generated based on a workflow 115 for a "chatbot" automation type. User interface 1300 may include an area 1305 that provides basic information relevant to all digital automations. Area 1305 as shown may provide "overview" information common to all digital automations, such as the id, name, automation type 120, status, and the like. In some implementations, this common relevant information may include information such as the target system(s) on which the digital automation operates, the repositories where the digital automation is stored, and other information. User interface 1300 may include further areas 1307, 1308 that display information that may be common to all digital automations 130, but may be logically separated due to their meaning or importance. For example, as shown FIG. 13, area 1307 shows a more detailed description of the selected digital automation 130 and further details on its organizational context (e.g., which organizations are responsible for it), while area 1308 shows a list of the people/roles that are associated with the selected digital automation 130.

User interface 1300 may include an area 1310 that is populated based on the workflow 115 associated with the automation type 120 of the selected digital automation 130. In the example shown in FIG. 11, the selected digital automation 130 is associated with the automation type 120 of "ChatBot", so the components of area 1310 have been generated based on the workflow 115 associated with a "ChatBot" automation type 120. As shown in FIG. 13, workflow 115 includes a "Checklist" component, an "Intake" component, a "Suitability" component, a "Legal/Security Survey" component, a "Develop" component and a "Deploy" component. The "Checklist" component is shown as component 1312, while the other components are shown as headings 1320 in FIG. 13 (indicating none has been selected for interaction).

Checklist component 1312 may be rendered in user interface 1300 based on the information in workflow component data store 245. For example, workflow component data store 245 may include information that specifies the user interface elements that are used to render the checklist component 1312 (e.g., user interface element identifiers, layout information for the user interface elements, etc.), as well as the content exposed in each user interface element. For example, the information associated with checklist component 1312 stored in workflow component data store 245 may specify the checklist items (e.g., "Draft", "Approval", "Analysis", "Sec/Lgl", "Pre Dev", "Design/Dev", "UAT", "Final Sec/Lgl", "Prod Ready", "Deployed", "Dry Run" and "Live"), the order of the checklist items, the items associated with each checklist item, and the like. Workflow component data store 245 may also store state information associated with the checklist component 1312 as applied to digital automation 130. For example, the completion state of each checklist item may be stored, such that when rendering the checklist component 1312, the completion state is depicted in user interface 1300. As shown in FIG. 13, certain of the checklist items have been colored, shaded and/or marked to indicate completion of the items associated with that checklist item, partial completion of the items associated with the checklist item, or non-completion of the items associated with the checklist item. In some embodiments, the completion state of checklist items may be determined based on approvals, as discussed further below.

In the example of FIG. 13, the checklist component 1312 also includes a status bar 1315 element that also renders content of the checklist component 1312. The status bar may be useful to highlight progress through a checklist (which may be further highlighted by using a "chevron" element to indicate the order of checklist progress).

Figure 14:
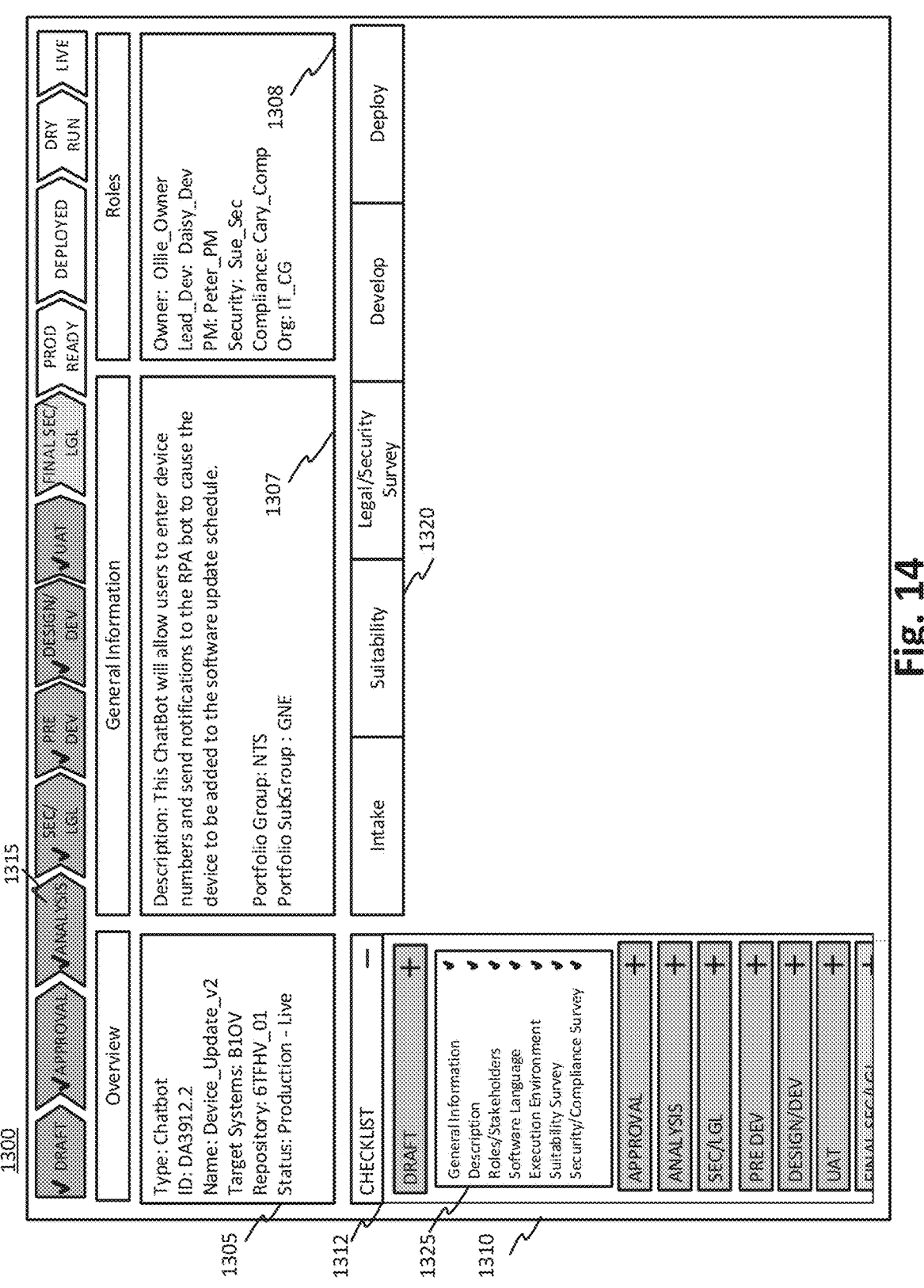
FIG. 14 is a diagram illustrating a third example user interface associated with DiGT, according to an embodiment.

FIG. 14 illustrates an example of user interface 1300 in which a user has selected the checklist item "Draft", which has caused DiGT 110 to render items 1325 that are associated with the "Draft" checklist item. Items 1325 may be specified in workflow component data store 245 with information such as names, order of display, linked user interface elements, and the like. Workflow component data store 245 may also store state information associated with the items 1325 as applied to digital automation 130. For example, the completion state of each item may be stored, such that when rendering the items 1325, the completion state is depicted in user interface 1300. As shown in FIG. 14, certain of the items have been colored, shaded and/or marked to indicate completion of the items 1325, partial completion of the items 1325, or non-completion of the items 1325. In some embodiments, the completion state of items may be determined based on approvals, as discussed further below.

Figure 15:
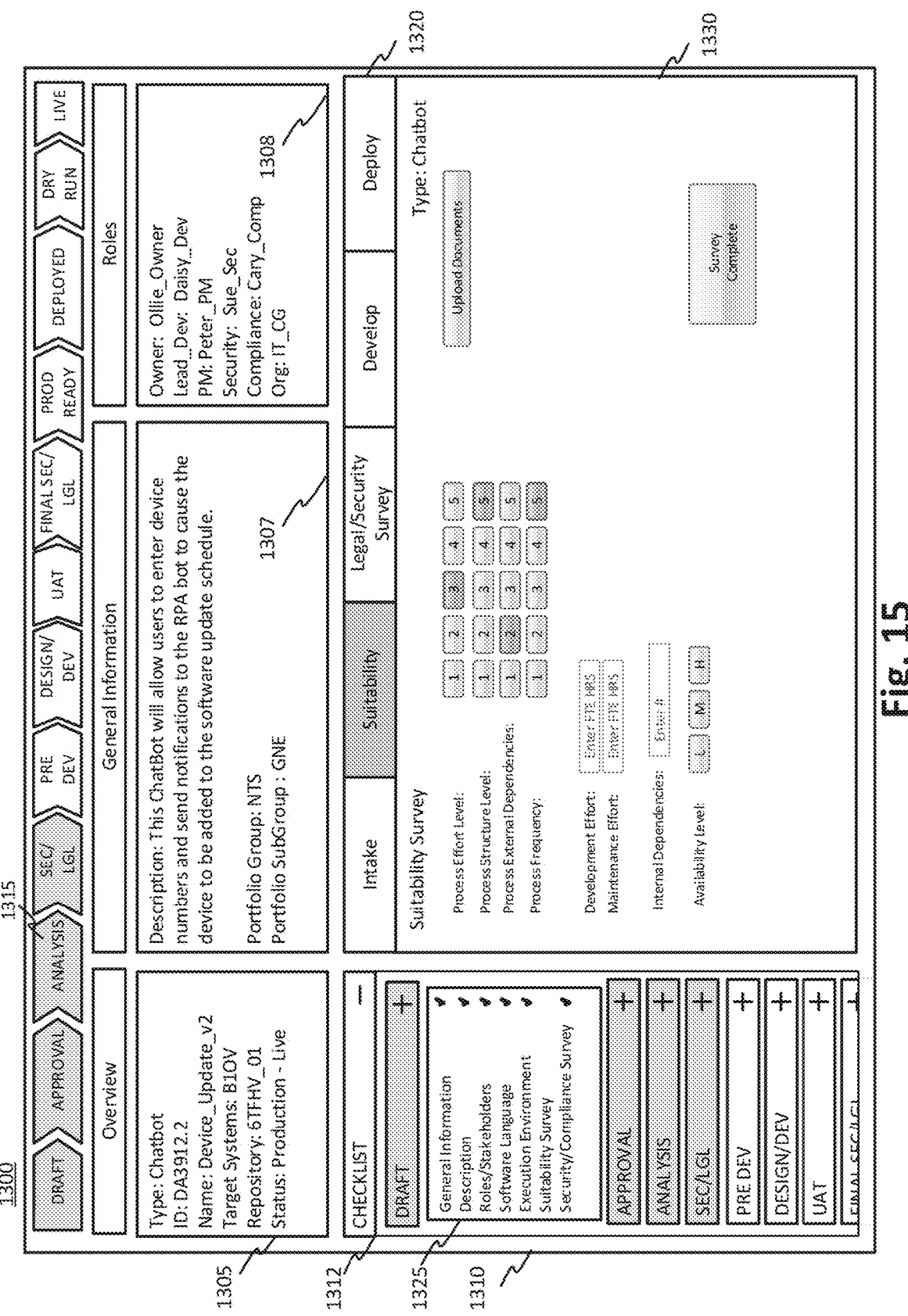
FIG. 15 is a diagram illustrating a fourth example user interface associated with DiGT, according to an embodiment.

In some implementations, checklist component 1312 may be reflective of the items of workflow 115, such that the checklist component 1312 reflects a progress of the digital automation 130 through its associated workflow 115. For example, each checklist item may be reflective of or generated based on the workflow components 117 associated with workflow 115. Additionally or alternatively, each item 1325 associated with a checklist item may be linked to a workflow component 117. The linked workflow component 117 may store completion state information and provide the completion state information to the item 1325. For example, as illustrated in FIG. 15, the "Suitability Survey" item in checklist component 1312 may be linked to a suitability survey component (and is shown as not completed). As shown, a user has selected the Suitability Survey component, for example, by selecting the "Suitability Survey" item in items 1325, or by selecting the "Suitability" component from headings 1320. DiGT 110 may retrieve the information associated with the suitability survey component 117, such as the user interface elements and component state information associated with digital automation 130, and generate a user interface using the user interface elements and component state information. The area 1330 may be used to display the user interface elements and component state information. A user may then review the component state information and input updated component state information.

Figure 5:
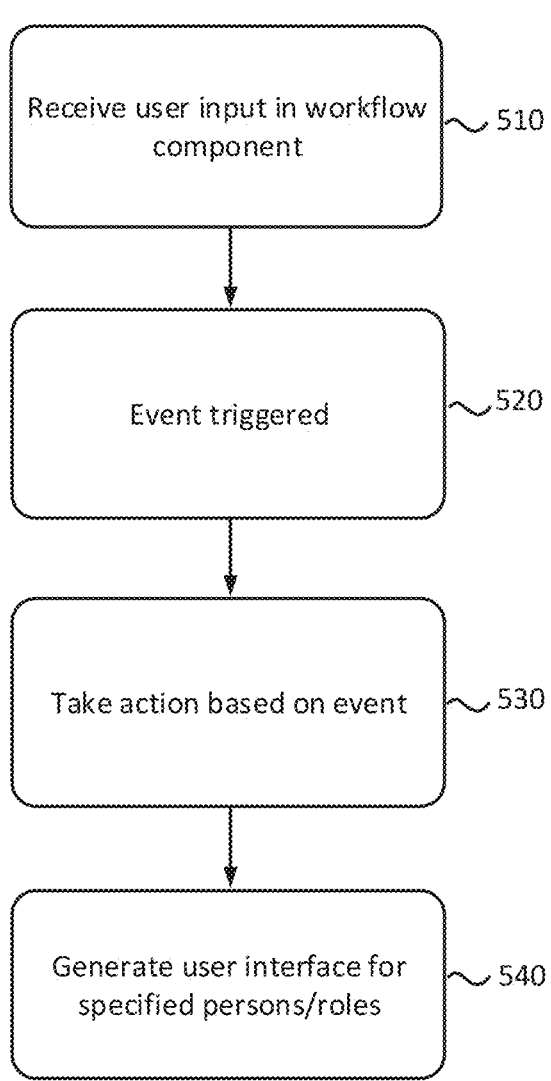
FIG. 5 is flow diagram illustrating another exemplary process associated with DiGT, according to an embodiment.
Figure 16:
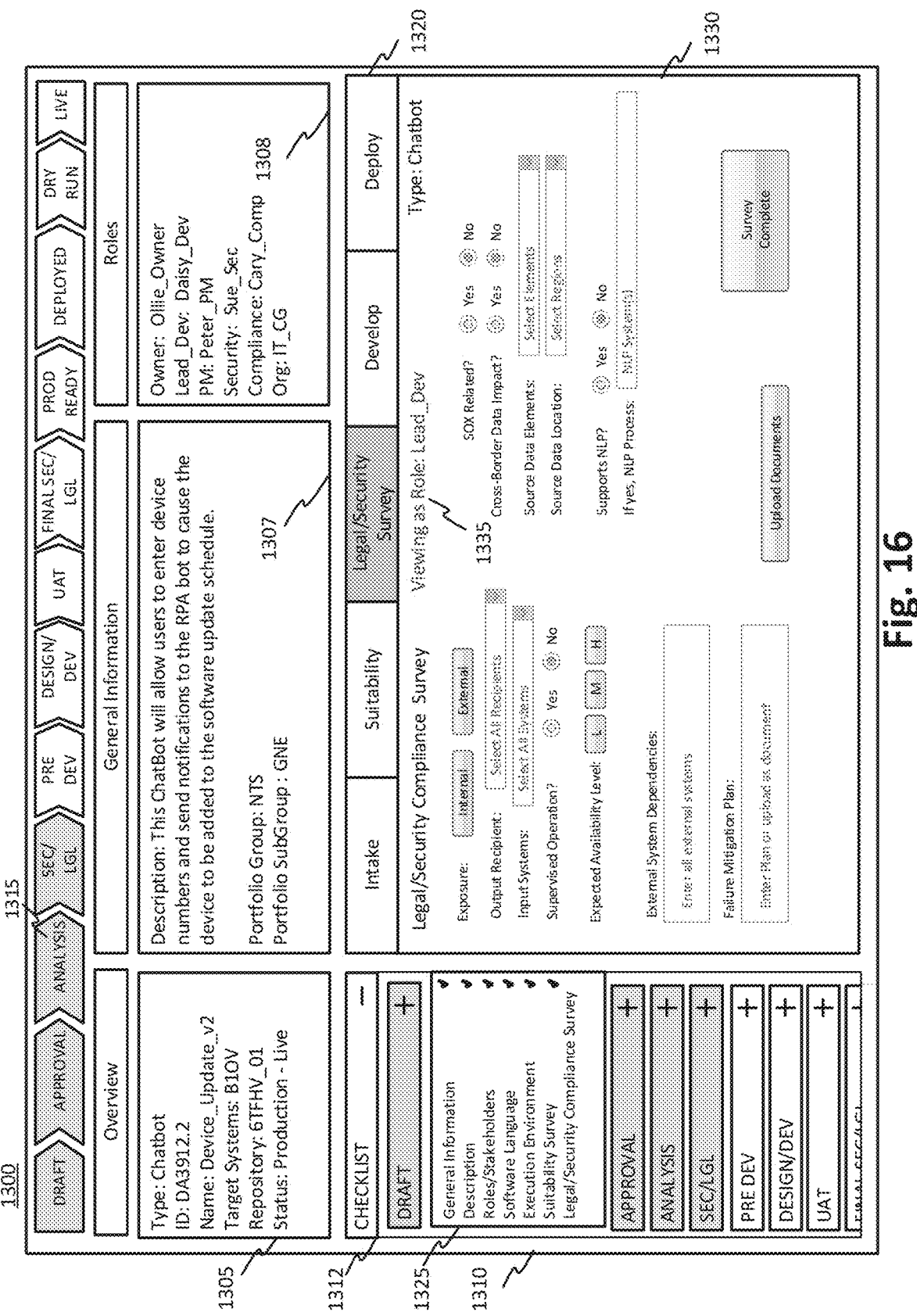
FIG. 16 is a diagram illustrating a fifth example user interface associated with DiGT, according to an embodiment.
Figure 17:
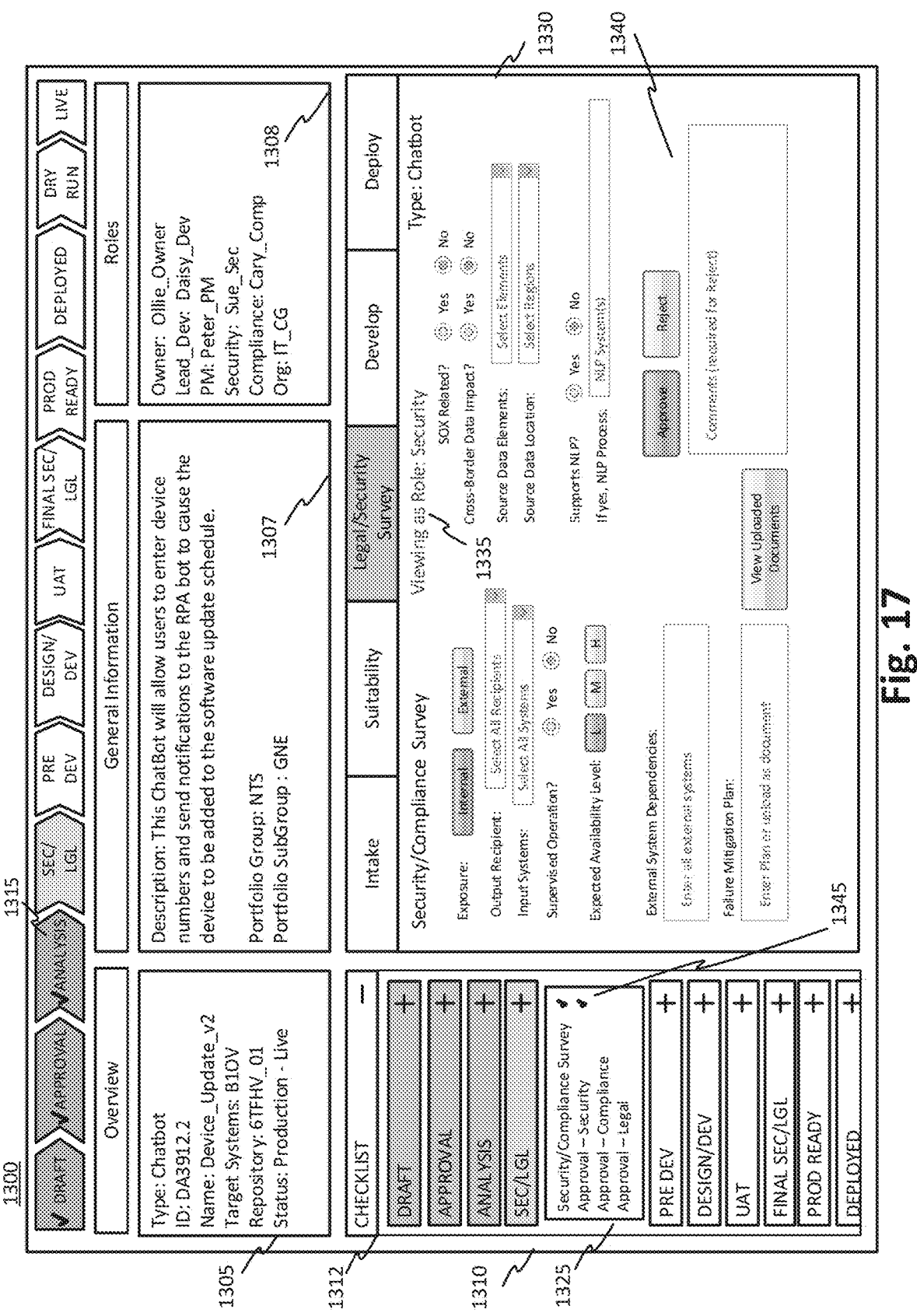
FIG. 17 is a diagram illustrating a sixth example user interface associated with DiGT, according to an embodiment.

As noted above, in some implementations, events may be associated with workplace components 117, such that the occurrence of an event may cause an action, such as a notification of specified parties, execution of specified processes, and the like. Also as noted above, users may be associated with roles, and each role may be assigned to different capabilities within workflow components and different events. FIG. 5, FIG. 16 and FIG. 17 illustrate an example of the interaction between workflow components and roles and events. As shown in FIG. 16, a user interface for a Legal/Security Survey component is being displayed in area 1330. The user interface provides user interface elements and component state information associated with the Legal/Security Survey component, but only those elements that are also associated with users having the role "Lead_Dev" (indicated by role indicator 1335). This allows certain information associated with a workflow element 117 and digital automation 130 to be exposed only based on user role.

Assume that the user with the role "Lead_Dev" completes the survey by entering requested information to the user interface elements and, in this example, selecting the "Survey Complete" control (FIG. 5, block 510). An event is triggered (FIG. 5, block 520) by the survey completion (e.g., an "input_submitted" event). For example, as noted above with reference to FIG. 10, workflow component data store 245 may store information associated with events, such as names, mapped workflow components, associated persons/roles, event handler callbacks, and the like.

DiGT 110 may then determine one or more actions to take based on the event (FIG. 5, block 530). For example, DiGT 110 may (e.g., through execution of instructions by a processor 320) determine if any actions have been specified for the event for the Legal/Security Survey component 117. As described above with reference to FIG. 10, information in the workflow component data store 245 may specify one or more actions to be taken for an event associated with a component. One possible action could be to notify certain people (e.g., those with certain roles) that the legal/security survey has been completed by the person with the role "Lead_Dev". Notification may be via a contact method associated with the person to notify (e.g., email, text message, other messaging), and may include in some implementations information about the event and a link to access DiGT 110. Another possible action could be to execute a process, such as an analysis process using the submitted information. For example, for an event associated with submission of the suitability survey, the suitability survey component may have an event handler specified that causes a suitability analysis to be executed using the information provided in the survey. Another possible action could be to update the status of other workflow components, for example, to reflect the status of the workflow component in which the event occurred.

Assume that based on the event, one or more persons with the role "Legal" and/or "Security" were notified that the Legal/Security Survey was completed. The person(s) may then access DiGT 110 to review the survey. Once the user(s) with the "Legal" and/or "Security" role are authenticated, DiGT 110 may then generate a user interface customized to the role(s) (FIG. 5, block 540). FIG. 17 illustrates an example user interface that shows information from a Legal/Security Survey component similar to that of FIG. 16, but includes additional elements 1340 that are associated with the role "Security" (indicated by role indicator 1335). The additional elements 1340 are not presentable to the user with the role "Lead_Dev" (as indicated by the additional elements 1340 not being shown in FIG. 16). The user may then provide their input into the user interface (e.g., indicating whether they approve the survey). The user's actions may themselves trigger events, such as an "approval" event, which may cause DiGT 110 to take further actions. For example, as shown in FIG. 17, the receipt of an approval indication from the user with the role "Security" may trigger an event that updates the state of the checklist items 1325, such that the completion state indicator 1345 for the item "Approval—Security" is updated to indicate a completed state, and may further trigger an event that sends a notification to the person with the role "Lead_Dev" indicating that the approval has been received. As another example, the receipt of a rejection indication from the user with the role "Security" may trigger an event that updates the state of the checklist items 1325, such that the completion state indicator 1345 for the item "Approval—Security" is updated to indicate a rejected state, and may further trigger an event that sends a notification to the person with the role "Lead_Dev" indicating that a rejection was received (which may allow the person to return to DiGT to address the issue that led to the rejection).

In some implementations, DiGT 110 may enforce "gating" requirements with respect to workflow components, such that users may only access certain workflow components once other workflow components have been completed. For example, dependency information may be included in workflow component data store 235 and/or workflow data store 240 that indicates whether a workflow component requires that another workflow component have been indicated as completed. In some implementations, completion may be indicated once all people who have been associated with approvals for the workflow component have provided their indication of approval (which may be stored, for example, in the digital automation data store 245 as noted above).

Figure 18:
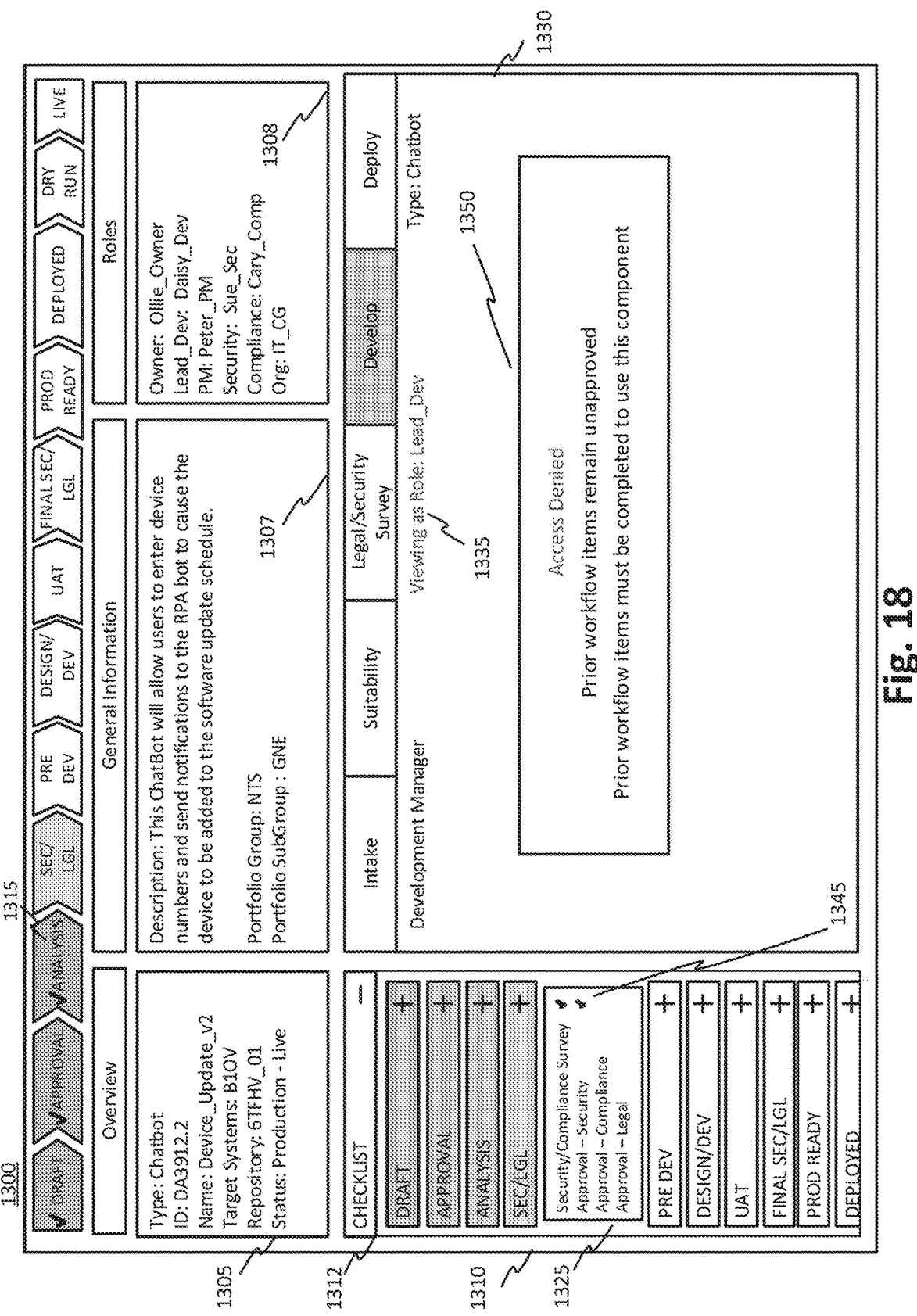
FIG. 18 is a diagram illustrating a seventh example user interface associated with DiGT, according to an embodiment.

FIG. 18 illustrates an example of enforcement of a gating requirement. As shown in FIG. 18, a user with the role "Lead_Dev" has attempted to access the workflow component "Develop" (as indicated by the shaded heading 1320). However, the Legal/Security Survey component has not been completed, as indicated by the completion state indicators for the "SEC/LGL" checklist item and its associated items (as shown, no approvals have been received from the people with the roles "Security" and "Legal"). DiGT 110 retrieves the information associated with the workflow 115 associated with this digital automation 130 and the workflow component 117 for the "Develop" component, and determines that dependency information requires that the Legal/Security Survey component be completed in order to access the "Develop" component. DiGT 110 generates a user interface element 1350 that indicates that access to the "Develop" component is not permitted due to the missing approvals for the required components. In some implementations, DiGT 110 may not allow user entry into some fields until a particular phase is reached. For example, a user may not enter a User Acceptance Testing (UAT) Sign Off field until after the UAT phase is reached.

As described herein, a governance tool for digital automations may provide developers and/or operations personnel a system that may efficiently develop, configure, deploy, and/or maintain digital automations across an organization, and do so by a process that enables policy enforcement and efficient management throughout its lifecycle. Accordingly, DiGT provides a systematic way to ensure that digital automations are developed, configured, and deployed properly.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 4 and 5, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. Further, certain portions of the invention may be implemented as a "component" or "system" that performs one or more functions. These components/systems may include hardware, such as a processor, an ASIC, a FPGA, or other processing logic, or a combination of hardware and software.

To the extent the aforementioned embodiments collect, store or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access controls, encryption, and de-identification/anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   receiving from a client device a request for information associated with a digital automation;
   determining an automation type associated with the digital automation;
   retrieving, based on the automation type, a workflow, wherein the workflow manages a lifecycle of the digital automation;
   retrieving workflow components associated with the workflow, wherein the workflow components comprise a digital automation suitability component and a digital automation legal and security survey component,
   wherein the digital automation suitability component is configured to determine whether deploying the digital automation is appropriate for performing a task, and
   wherein the digital automation legal and security survey component is configured to allow designated users to complete a legal and security survey;
   generating a user interface based on the workflow and the workflow components, the user interface including information associated with the digital automation;
   providing the user interface to the client device in response to the request;
   receiving a second request for access to a first one of the workflow components;
   determining that a second one of the workflow components has not been completed;
   enforcing, based on a determination that the second one of the workflow components has not been completed, access requirements for the client device with respect to the one or more workflow components; and generating, based on the enforcing, a user interface element indicating that the access to the first one of the workflow components is not permitted.

2. The method of claim 1, wherein the automation type is one of a plurality of automation types, and the plurality of automation types includes at least one of a robotic process automation (RPA), a robotic desktop automation (RDA), a chatbot automation, a natural language generator, a natural language processor, an advanced analytics tool, a visualization, or a scripted automation.

3. The method of claim 1, further comprising:
   providing the user interface element to the client device in response to the second request.

4. The method of claim 1, wherein generating the user interface includes:
   determining a role of a user of the client device, and
   generating the user interface based on the role of the user.

5. The method of claim 1, wherein the designated users associated with the digital automation legal and security survey component comprise developers associated with the digital automation.

6. The method of claim 1, wherein the workflow components include a checklist component, and wherein the checklist component is associated with information that includes information that specifies user interface elements and state information as applied to the digital automation.

7. The method of claim 1, further comprising:
   receiving information associated with the digital automation through the user interface;
   triggering an event based on the receipt of the information associated with the digital automation; and
   taking an action based on the event, wherein the action is specified by one of the workflow components.

8. The method of claim 7, wherein the action includes:
   sending a notification to a person based on an association of the person with a role.

9. A device, comprising:
   an interface that communicates via a network; and
   a processor, coupled to the interface, wherein the processor is configured to:
   receive from a client device over the interface a request for information associated with a digital automation;
   determine an automation type associated with the digital automation,
   retrieve, based on the automation type, a workflow, wherein the workflow manages a lifecycle of the digital automation,
   retrieve workflow components associated with the workflow, wherein the workflow components comprise a digital automation suitability component and a digital automation legal and security survey component,
   wherein the digital automation suitability component is configured to determine whether deploying the digital automation is appropriate for performing a task, and
   wherein the digital automation legal and security survey component is configured to allow designated users to complete a legal and security survey,
   generate a user interface based on the workflow and the workflow components, the user interface including information associated with the digital automation,
   provide the user interface to the client device over the interface in response to the request,
   receive a second request for access to a first one of the workflow components, determine that a second one of the workflow components has not been completed, enforce, based on a determination that the second one of the workflow components has not been completed, access requirements for the client device with respect to the workflow components, and generate, based on the enforcement, a user interface element indicating that the access to the first one of the workflow components is not permitted.

10. The device of claim 9, wherein the automation type is one of a plurality of automation types, and the plurality of automation types includes at least one of a robotic process automation (RPA), a robotic desktop automation (RDA), a chatbot automation, a natural language generator, a natural language processor, an advanced analytics tool, a visualization, or a scripted automation.

11. The device of claim 9, wherein the processor is further configured to:

provide the user interface element to the client device over the interface in response to the second request.

12. The device of claim 9, wherein when the processor generates the user interface, the processor is further configured to:

determine a role of a user of the client device, and generate the user interface based on the role of the user.

13. The device of claim 9, wherein the designated users associated with the digital automation legal and security survey component comprise developers associated with the digital automation.

14. The device of claim 9, wherein the workflow components include a checklist component, and wherein the checklist component is associated with information that includes information that specifies user interface elements and state information as applied to the specified digital automation.

15. The device of claim 9, wherein the processor is further configured to:

receive information associated with the digital automation through the user interface;

trigger an event based on the receipt of the information associated with the digital automation; and take an action based on the event, wherein the action is specified by one of the workflow components.

16. The device of claim 15, wherein the action includes: sending a notification to a person based on an association of the person with a role.

17. A non-transitory computer-readable medium comprising instructions, which, when executed by a processor, cause the processor to:

receive from a client device a request for information associated with a digital automation;

determine an automation type associated with the digital automation, retrieve, based on the automation type, a workflow, wherein the workflow manages a lifecycle of the digital automation, retrieve workflow components associated with the workflow, wherein the workflow components comprise a digital automation suitability component and a digital automation legal and security survey component, wherein the digital automation suitability component is configured to determine whether deploying the digital automation is appropriate for performing a task, and wherein the digital automation legal and security survey component is configured to allow designated users to complete a legal and security survey, generate a user interface based on the workflow and the workflow components, the user interface including information associated with the digital automation, provide the user interface to the client device in response to the request, receive a second request for access to a first one of the workflow components, determine that a second one of the workflow components has not been completed, enforce, based on a determination that the second one of the workflow components has not been completed, access requirements for the client device with respect to the workflow components, and generate, based on the enforcement, a user interface element indicating that the access to the first one of the workflow components is not permitted.

18. The non-transitory computer-readable medium of claim 17, wherein the instructions further cause the processor to:

receive information associated with the digital automation through the user interface;

trigger an event based on the receipt of the information associated with the digital automation; and take an action based on the event, wherein the action is specified by one of the workflow components.

19. The non-transitory computer-readable medium of claim 17, wherein the instructions further cause the processor to:

determine a role of a user of the client device, and generate the user interface based on the role of the user.

20. The device of claim 9, wherein a first completion state associated with the second workflow component corresponds to an indication of approval from personnel performing one or more roles, and the processor is further configured to:

provide the user interface element to the client device in response to the second request.

\* \* \* \* \*